United States Patent Office 2,905,643
Patented Sept. 22, 1959

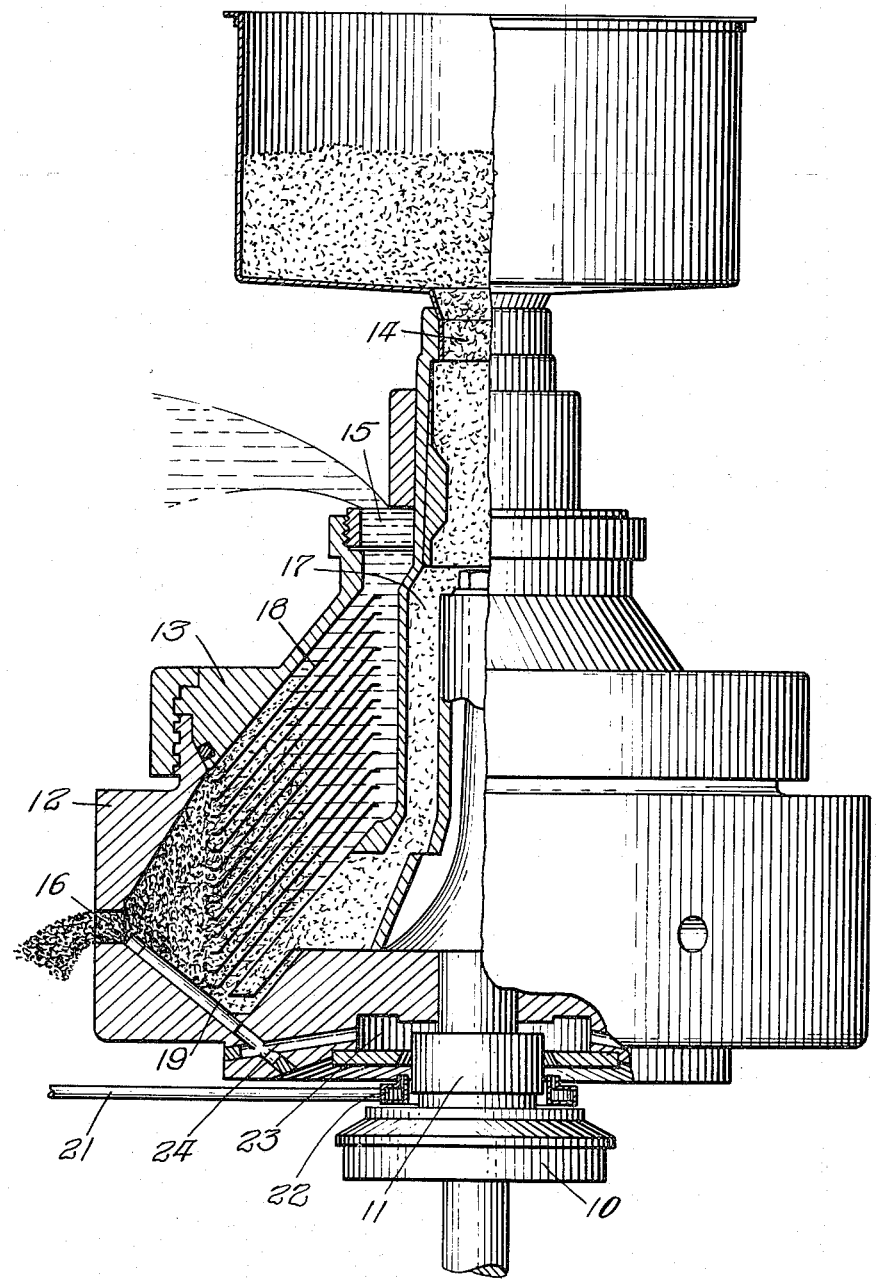

2,905,643

METHOD OF DEWATERING CLAY

Robert F. Billue, Tennille, and John T. Williamson, Sandersville, Ga., assignors to Thiele Kaolin Company, a corporation of Georgia Application June 14, 1954, Serial No. 436,454

10 Claims. (Cl. 252—313)

This invention relates to the dewatering of semi-colloidal materials of which clay is an example and relates, particularly, to those members of the system which can be put reversibly into a flocculated-deflocculated, or dispersed state.

Finely divided particles of matter, when suspended in a liquid, normally carry an electric charge which differs with different products and the nature of which is not fully agreed upon. However, chemicals have the effect on normal semi-colloidal materials of causing the particles to flock together loosely, or of dispersing or deflocculating the flocculated groups. Thus on clay certain chemicals will cause the clay to disperse into individual particles, particularly when agitated in the presence of the chemicals; whereas, other chemicals will cause the dispersed particles to group together and this cycle may normally be repeated. With china clay, the customary dispersing or deflocculating agent is a molecularly dehydrated phosphate, such as tetrasodium pyrophosphate, sodium metaphosphate, or alkaline materials like sodium metasilicate.

The preferred materials differ with different clays and different concentrations of the same clays, but dispersion of clay is a well known art and no claim is made to that here. On the other hand, the clay is normally flocculated by acids.

When in the flocculated condition, the clay particles settle with extreme rapidity from water and the aqueous slurry has a much higher viscosity at a given solids content than does the dispersed clay. A flocculated clay mix which is so viscous that it can hardly be worked can be made water-thin by the addition of a very small amount of dispersing agent. When dispersed, the clay particles settle quite slowly.

Because of the grouping of flocculated clay particles, filtration of clay is normally done in the flocked condition. The dispersed clay has a serious tendency to run through the filters, but can be filtered if the solids content is quite high.

The term "semi-colloidal" as used herein defines a product whose particles normally carry over into the colloidal range as with clay and which contains no important percentage of particles which can be removed by ordinary screens. Normally, the bulk of particles is below 5 microns in equivalent spherical diameter as measured by commercially utilized particle determination methods of the sedimentation type.

Other members of the group include zinc oxide, calcium carbonate, lithopone, titanium dioxide, and barium sulfate. While the foregoing list mentions only inorganic compounds, the invention is applicable to inorganic or organic, or mixed organic-inorganic materials provided they may be put into the flocculation-deflocculation cycle.

The invention consists in producing a flocculated fluid slurry of the semi-colloidal material at a solids content sufficiently low that the material is readily flowable, and then subjecting the flocculated fluid material to centrifugal classification whereby the solid constituent of the slurry moves in one direction, usually outward, while the fluid member of the material, which is normally water, moves in the other direction, which is usually inward. The choice of direction of movement, of course, depends upon the relative densities of the two ingredients.

This centrifugal classification thus results in the dewatering or de-fluidizing of the flocculated fluid with the production of a watery effluent at one part of the centrifugal operation and a flocculated concentrate at another part of the operation.

Up to this point, the operation is conventional. We deviate from conventional practice at this point by introducing to the flocculated concentrate a dispersing medium just prior to the time that the concentrate is about to leave the centrifugal operation, whereby it is converted from the flocculated to the deflocculated condition and its viscosity enormously reduced without significantly raising its water content.

By using this combination of steps, it is possible to produce a product of very much higher solids content from a centrifugal operation than was possible before.

The invention may be carried out directly in standard centrifuges, particularly those which are provided with so-called recirculation tubes or the like which are available for supplying liquid at or adjacent to the discharge nozzles.

The invention is illustrated diagrammatically in the drawing which is an elevation, partly in section, of a conventional centrifuge, in this case a Sharples centrifuge now on the market.

In the drawing, the centrifuge is shown as mounted on a base 10 adapted for driving connection to a driving means not shown. The centrifuge shaft 11 carries the bowl 12 which is provided with the usual housing 13, a feed opening 14, an effluent discharge opening 15, and a plurality of discharge nozzles 16.

The discharge nozzles are arranged in a radial pattern, there normally being from six to twelve of these nozzles.

In the operation of the centrifuge, the slurry is fed in the top at 14 and proceeds downwardly around the shaft through the chamber 17 underneath the vanes 18 entering the bowl proper at 19. Under the influence of the centrifuge, the water, being lighter than clay, works inwardly along the vanes toward the effluent discharge zone 20 from which it progresses upwardly to effluent discharge 15. The flocculated clay builds up adjacent the nozzle 16.

Dispersing medium is fed through the pipe 21 to the ejector 22 from which it is sprayed or ejected into the annular collecting zone 23. This zone comprises an annulus which forms a manifold in connection with recirculation tubes 24. These tubes lead to a point immediately adjacent the nozzle 16 and have a discharge opening 25 at that point. In some centrifuges, the recirculation tubes end a short distance away from the nozzle and in such cases it is preferred to employ an extension which leads directly to the nozzle opening.

In the operation of the device, as applied to clay, a slurry of flocculated clay at low solids content, as for example 26% solids, is introduced. The slurry passes through the chamber 17 to the bowl through the area 19 and then the flocculated clay begins to move outwardly and the water inwardly along the vanes 18. While we have mentioned vanes here, it is well understood in the art that other conventional means for controlling and directing the separation may be employed. The clay moves toward the nozzles and is discharged therefrom. In normal operation of a centrifuge on flocculated clay, the speed of feeding and rotation are controlled so that the discharge from the nozzles is sufficiently low in solids as to be fluid. Under the conditions of the present invention, the speed and feed and other conditions may be varied to produce solids contents at the discharge nozzle which ordinarily would plug up the nozzles and not be discharged at all. In order to accomplish this, the dispersing medium is fed through the line 21, ejected into the annulus 23 from the ejectors 22 and is fed through the recirculation tubes 24 to discharge at the point 25. At this point, the dispersing medium, which is supplied only in relatively small proportion so as not materially to affect the solids content of the clay, tremendously reduces the viscosity of the clay and permits it to flow freely from the nozzles.

It is important, of course, that the specific gravity of the dispersing agent be sufficiently high that it does not enter into the main part of the bowl and cause dispersion of the clay therein, but that its operation should be confined to the area within the nozzle or nozzle chamber.

As an example of a specific operation, a Sharples DH-2 Nozljector was equipped with a clarifier disc stack and twelve 0.035" nozzle bushings. The bowl was operated at 6200 r.p.m. with a feed slip at ambient temperature.

The injection liquid was Calgon having a specific gravity of 1.604, and a clay discharge of 50% solids was obtained, using a 26% solids initial clay slurry as the feed.

Using the same equipment with six 0.031" nozzle bushings and the same dispersing agent, the clay was concentrated to 55% solids.

In another operation, Calgon of approximately 1.30 specific gravity was employed in the recirculation tubes and found to work satisfactorily up to a solids content of about 50%.

In another operation, a Calgon solution of 1.604 specific gravity was employed, starting with a flocculated clay of approximately 26% solids content. Calgon was supplied at the rate of one gallon per hour.

Clay with solids contents up to 51% was obtained from the nozzles.

In the operations previously described in which the six 0.031" nozzles were employed, the feed was a 4.0 pH china clay having approximately 72% of the particles below 2 microns as determined by the Bouyoucos sedimentation method. Calgon was supplied at the rate of 5½ gallons per hour.

The product produced ranged from 45.9 to 54.4 solids.

Calgon is sodium hexametaphosphate. Other defloculents for clay are as follows:

Tetrasodium pyrophosphate
Sodium tripolyphosphate
Sodium tetrapyrophosphate
Sodium silicate
Disodium phosphate
Tetrapotassium pyrophosphate
Potassium tripolyphosphate
Sodium potassium tripolyphosphate
Caustic soda
Sodium carbonate
Organic deflocculants such as humic acid The dispersing agent may be fed in a high solids clay slip, say at 70% solids heavily overloaded with dispersing agent. In this way, a higher specific gravity may be obtained without loss of mobility (i.e., avoidance of high viscosity) than is the case with Calgon alone. Under certain conditions, weighting agents may be employed with the dispersing agent, i.e., heavy powder such as barium sulfate or the like.

It is possible, by this system, to build up a solids content between 50% and 70% if desired and thereby eliminate filter presses or a rotary filter so that the clay may be fed, without pressing or filtering or blunging, directly to a spray dryer or drum dryer. It would thus avoid the addition of water and dispersing agent during the blunging operation and save additionally on costs for that reason.

In the treatment of clay for purification, the standard procedures involve mining of the clay, dispersion of the clay in a dispersing agent such as Calgon, sodium silicate, tetrasodium pyrophosphate or the like, settling or centrifugation to remove sand and gross impurities, followed by a gravity separation or fractionation of the clay into one fraction which has an average of finer particles and another fraction which has an average of coarser particles. This separation may be by gravity settling, elutriation, or by centrifugation. In any event, it is carried out in the dispersion phase of the clay. Thereafter, the clay, which is usually bleached in an acid bleach, is flocculated and the water is separated from it in the flocculated state, normally by a filtering system. This may be accomplished by filter presses where the clay is discharged in the neighborhood of 68% solids, or by continuous rotary vacuum filters where the clay is normally discharged at approximately 63% solids, or by a combination of centrifuges and rotary vacuum filters where the clay is discharged from the centrifuge at 40% to 45% solids and further dewatered in a vacuum filter to around 63% solids.

In carrying out the process, the mined clay, which has been dispersed and fractionated, forms a settled phase and a supernatant phase in which clay material is still suspended. This supernatant phase is removed from the settled phase and flocculated, normally as a part of a bleaching operation. It is this flocculated material which is then centrifuged. The centrifuging forms a watery effluent and a high solids clay material, and this invention involves the addition to the high solids material, just before it leaves the centrifuge of a high specific gravity fluid dispersant which flows with the high solids clay material under the influence of the centrifuge and thus does not back up into the main body of flocculated material.

The following clay materials are normally of the flocculated-deflocculated cycle type:

I. Kaolin group (china clay, ball clay, mica clay):
    (a) Kaolinite
    (b) Nacrite
    (c) Dickite
    (d) Halloysite II. Montmorillonite group:
    (a) Bentonite
    (b) Fuller's earth
    (c) Nontronite
    (d) Saponite
    (e) Hectorite III. Chlorite group:
    (a) Attapulgite
    (b) Sapiolite
    (c) Palygorskite IV. Illite group V. Allophane group It has been calculated that a dispersing agent at a specific gravity of 1.19 or higher can be discharged through the recirculation tubes into flocculated clay at 60% solids in the bowl of the particular centrifuge used in this test. We have used Calgon at a specific gravity of 1.3, discharging it into the bowl area adjacent to the nozzle, and strangely enough the clay in the immediate area deflocculated and exhausted through the nozzle at 51% solids, and without the dispersing agent backing up into the body of the flocculated clay being centrifuged.

It is not necessary in all cases to feed the dispersing agent constantly, as in some cases an intermittent feed may be even more desirable. The invention also contemplates a 2-stage operation in which flocked clay at 20% to 28% solids is dewatered to 40% to 45% solids while still flocked and then in a second stage this 40% to 45% material is dewatered to higher solids content and this higher solids content dispersed as it passes from the nozzles or their equivalent. The 2-stage process has certain advantages in higher capacity on higher solids.

The foregoing detailed description has been given for clearness of understanding only and no unnecessary limitations should be understood therefrom as modifications will be obvious to those skilled in the art.

We claim:

1. The process of dewatering clay which comprises subjecting a body of flocculated clay-water mix to centrifugal action in an enclosed zone to form a watery effluent which is removed from an interior portion of the zone, and a mass of viscous partially dewatered flocculated clay at an outer portion of said zone, introducing a liquid deflocculating agent of high specific gravity to an inner portion of the centrifugal zone and conveying it separately from the clay-water mix to the outer portion of the centrifugal zone and there supplying the deflocculating agent to said partially dewatered flocculated clay to deflocculate it as the latter emerges from the centrifugal zone.

2. A continuous process for the concentration of solids existing in flocculated state in an admixture thereof with liquid, said solids being capable of being converted to a deflocculated state from said flocculated state, which comprises feeding a stream of said admixture into a centrifuging zone to concentrate said solids while in said flocculated state, separately discharging from said centrifuging zone liquid thus separated from solids thus concentrated, and separately discharging from said centrifuging zone the concentrated solids including injecting a deflocculating agent for the solids into the concentrated solids to fluidize the concentrated solids just prior to the discharge thereof from said centrifuging zone.

3. The continuous process of concentrating material dispersed in a liquid, said material being flocculable and deflocculable in said liquid, which comprises subjecting the material dispersed in the liquid in the flocculated form at an initial concentration to centrifugal force in a centrifuging zone causing the material to move in one direction and the liquid in another direction thereby producing a portion more concentrated with flocculated material, and a portion less concentrated with flocculated material, than the initial concentration of flocculated material in the liquid, introducing a deflocculating agent for said material into the more concentrated portion of flocculated material to deflocculate it, discharging the deflocculated material from the centrifuging zone, and separately discharging from the centrifuge zone the portion less concentrated with flocculated material.

4. The process of claim 3 in which the material migrates outwardly and the liquid migrates inwardly.

5. The process of claim 3 in which the fluid is water.

6. The process of claim 3 in which the liquid is water and the material is semi-colloidal clay.

7. The process of claim 6 in which the viscosity of the more concentrated portion is too high for removal with centrifuging while in the flocculated form.

8. The continuous process of dewatering clay which comprises centrifuging a flocculated clay-water mix to form an essentially watery effluent and a residual dewatered flocculated clay, introducing a deflocculating agent for the clay in proximity to a discharge nozzle to deflocculate the dewatered clay and discharging the deflocculated dewatered clay through the nozzle by centrifugal action.

9. The process of claim 8 in which the dispersing agent is a solution having a specific gravity at least as great as that of the clay material entering the orifice.

10. The process of claim 8 in which the dewatered flocculated clay has a solids content of at least 50%.

References Cited in the file of this patent

UNITED STATES PATENTS

| | | |
|---|---|---|
| 1,846,076 | Andersson | Feb. 23, 1932 |
| 1,887,476 | Lindgren | Nov. 8, 1932 |
| 2,440,601 | Dickerman | Apr. 27, 1948 |
| 2,648,636 | Ellis et al. | Aug. 11, 1953 |